US012456137B2

(12) United States Patent
Ganesan et al.

(10) Patent No.: US 12,456,137 B2
(45) Date of Patent: Oct. 28, 2025

(54) PERSONALIZING AN INTERACTION BETWEEN A MOBILE DEVICE ASSOCIATED WITH A USER AND AN APPLICATION OR A WEBSITE ASSOCIATED WITH A WIRELESS TELECOMMUNICATION NETWORK

(71) Applicant: T-Mobile USA, Inc., Bellevue, WA (US)

(72) Inventors: Vigneshwaran Ganesan, Fort Worth, TX (US); Jie Hui, Mercer Island, WA (US); Maria Huynh, Seattle, WA (US); Vipul M. Sagare, Coppell, TX (US); Kristian D. Taylor, Chester, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 229 days.

(21) Appl. No.: 18/191,706

(22) Filed: Mar. 28, 2023

(65) Prior Publication Data
US 2024/0330999 A1  Oct. 3, 2024

(51) Int. Cl.
*G06Q 30/06*  (2023.01)
*G06N 5/04*  (2023.01)
*G06Q 30/0601*  (2023.01)

(52) U.S. Cl.
CPC .......... *G06Q 30/0617* (2013.01); *G06N 5/04* (2013.01)

(58) Field of Classification Search
CPC ...... G06Q 30/0617; G06N 5/04; G06F 40/20; G10L 15/1815
See application file for complete search history.

(56) References Cited

U.S. PATENT DOCUMENTS 5,953,652 A  9/1999 Amin et al.
6,947,761 B2  9/2005 Hutcheson et al.
(Continued)

FOREIGN PATENT DOCUMENTS

CN   1951094 A   4/2007
CN  104685523 B   3/2019
(Continued)

OTHER PUBLICATIONS

Martin, Erik J. "It's Time to Assess Your Contact Center Infrastructure: Weigh which technologies you need and which you can eliminate"; CRM Magazine25.3: 18(5). Information Today, Inc. (Apr. 2021) retrieved from Dialog on Feb. 3, 2025 (Year: 2021).*

*Primary Examiner* — Yogesh C Garg
(74) *Attorney, Agent, or Firm* — Perkins Coie LLP

(57) ABSTRACT

The disclosed system obtains data entries associated with a user including segmentation, preferences, behavior elements, contextual events, and trust expectations. The system obtains data entries associated with the wireless telecommunication network including available products, available promotions, and selling channels. The system receives an indication to initiate an interaction between the user and a channel associated with the wireless telecommunication network, where the interaction is aimed at completing a task. Based on the indication to initiate the interaction, the data entries associated with the user, and the data entries associated with the wireless telecommunication network, the system generates a first question to present to the user. The system receives a response to the question from the user. Based on the response, the system generates a second question to present to the user, where the second question furthers completion of the task.

20 Claims, 9 Drawing Sheets

(56) References Cited

U.S. PATENT DOCUMENTS

| | | |
|---|---|---|
| 7,097,094 B2 | 8/2006 | Lapstun et al. |
| 7,292,996 B2 | 11/2007 | Nobrega et al. |
| 7,333,820 B2 | 2/2008 | Sheha et al. |
| 7,565,547 B2 | 7/2009 | Matta et al. |
| 7,574,493 B2 | 8/2009 | Hutcheson et al. |
| 7,873,708 B2 | 1/2011 | Durand et al. |
| 8,103,501 B2 | 1/2012 | Mumm et al. |
| 8,135,624 B1 | 3/2012 | Ramalingam et al. |
| 8,166,407 B2 | 4/2012 | Lee et al. |
| 8,317,618 B2 | 11/2012 | Malik |
| 8,340,637 B2 | 12/2012 | Drovdahl et al. |
| 8,380,858 B2 | 2/2013 | Froelich |
| 8,498,385 B2 | 7/2013 | Theppasandra et al. |
| 8,676,991 B2 | 3/2014 | Gupta et al. |
| 8,694,352 B1 | 4/2014 | Hawkins et al. |
| 8,731,168 B1 | 5/2014 | Webster et al. |
| 8,751,327 B1 | 6/2014 | Park et al. |
| 8,838,081 B2 | 9/2014 | Spence et al. |
| 9,042,540 B2 | 5/2015 | Tuchman et al. |
| 9,083,680 B2 | 7/2015 | Marsico |
| 9,118,763 B1 | 8/2015 | Margulies et al. |
| 9,336,687 B2 | 5/2016 | Exeter et al. |
| 9,384,490 B2 | 7/2016 | Anchala |
| 9,396,483 B2 | 7/2016 | Hamedi |
| 9,407,711 B2 | 8/2016 | Bayen et al. |
| 9,438,690 B2 | 9/2016 | Tonev et al. |
| 9,565,637 B2 | 2/2017 | Tran et al. |
| 9,710,821 B2 | 7/2017 | Heath |
| 9,749,839 B2 | 8/2017 | Roberts |
| 9,754,311 B2 | 9/2017 | Eisen |
| 9,754,313 B2 | 9/2017 | Rao |
| 9,773,105 B2 | 9/2017 | Li et al. |
| 9,774,594 B2 | 9/2017 | Gatto et al. |
| 9,824,323 B1 | 11/2017 | Weiss et al. |
| 9,846,897 B2 | 12/2017 | Roden et al. |
| 9,853,959 B1 | 12/2017 | Kapczynski et al. |
| 9,854,317 B1 | 12/2017 | Abboa-offei et al. |
| 9,881,301 B2 | 1/2018 | Rajkumar et al. |
| 9,883,339 B1 | 1/2018 | Gu et al. |
| 9,888,342 B2 | 2/2018 | Cariss et al. |
| 9,912,423 B2 | 3/2018 | Kesling et al. |
| 9,959,551 B1 | 5/2018 | Schermerhorn et al. |
| 9,959,689 B2 | 5/2018 | Pulitzer |
| 10,074,101 B2 | 9/2018 | Zilkha |
| 10,140,641 B2 | 11/2018 | Smith et al. |
| 10,291,669 B2 | 5/2019 | Dharmaji |
| 10,292,057 B2 | 5/2019 | Velusamy et al. |
| 10,311,066 B1 | 6/2019 | Ko et al. |
| 10,311,535 B2 | 6/2019 | Corral et al. |
| 10,432,892 B1 | 10/2019 | Tamayo et al. |
| 10,437,834 B2 | 10/2019 | Harris et al. |
| 10,497,019 B2 | 12/2019 | Nash et al. |
| 10,542,524 B1 | 1/2020 | Reeves et al. |
| 10,652,240 B2 | 5/2020 | Brand |
| 10,656,239 B2 | 5/2020 | Reed et al. |
| 10,713,311 B2 | 7/2020 | Wang |
| 10,715,996 B1 | 7/2020 | Singh et al. |
| 10,776,818 B1 | 9/2020 | Nash et al. |
| 10,820,200 B2 | 10/2020 | Syed et al. |
| 10,863,359 B2 | 12/2020 | Talwar |
| 10,951,698 B2 | 3/2021 | Jhanji et al. |
| 10,977,671 B2 | 4/2021 | Jayan et al. |
| 11,051,067 B1 | 6/2021 | Baxter et al. |
| 11,068,518 B2 | 7/2021 | Guo et al. |
| 11,089,017 B1 | 8/2021 | Alexander et al. |
| 11,202,212 B2 | 12/2021 | Karanam |
| 11,206,330 B1 | 12/2021 | Nguyen et al. |
| 11,238,380 B1 | 2/2022 | Perry et al. |
| 11,297,513 B2 | 4/2022 | Agarwal et al. |
| 11,301,877 B2 | 4/2022 | Cheesman et al. |
| 11,445,357 B1 | 9/2022 | Arends et al. |
| 11,463,865 B1 | 10/2022 | Buscher |
| 11,546,659 B2 | 1/2023 | Oztaskent et al. |
| 11,551,293 B1 | 1/2023 | Soccorsy et al. |
| 2002/0147658 A1 | 10/2002 | Kwan |
| 2003/0171983 A1 | 9/2003 | Reeves et al. |
| 2004/0143523 A1 | 7/2004 | Pegaz-paquet et al. |
| 2005/0192870 A1* | 9/2005 | Geddes .............. G06N 5/04 705/26.8 |
| 2005/0233733 A1 | 10/2005 | Roundtree et al. |
| 2005/0277102 A1 | 12/2005 | Gillette et al. |
| 2006/0180664 A1 | 8/2006 | Barrett et al. |
| 2007/0156443 A1 | 7/2007 | Gurvey |
| 2007/0265006 A1 | 11/2007 | Washok et al. |
| 2008/0052155 A1 | 2/2008 | Tafferant et al. |
| 2008/0114737 A1 | 5/2008 | Neely et al. |
| 2009/0043623 A1 | 2/2009 | Blades et al. |
| 2009/0076912 A1 | 3/2009 | Rajan et al. |
| 2010/0179998 A1 | 7/2010 | Matteini et al. |
| 2010/0306076 A1 | 12/2010 | Taveau et al. |
| 2011/0177774 A1 | 7/2011 | Gupta et al. |
| 2011/0307320 A1 | 12/2011 | Tangney et al. |
| 2013/0124189 A1* | 5/2013 | Baldwin ............ G06F 40/20 704/235 |
| 2013/0217333 A1 | 8/2013 | Sprigg et al. |
| 2014/0089098 A1 | 3/2014 | Roundtree |
| 2015/0237161 A1 | 8/2015 | Young et al. |
| 2015/0269850 A1 | 9/2015 | Rivera De La Vega et al. |
| 2018/0060904 A1 | 3/2018 | Hunt et al. |
| 2018/0130053 A1 | 5/2018 | Matthews et al. |
| 2018/0137480 A1 | 5/2018 | Houghton et al. |
| 2018/0174130 A1 | 6/2018 | Shroff et al. |
| 2018/0315499 A1 | 11/2018 | Appelbaum et al. |
| 2018/0316668 A1 | 11/2018 | Yasarapu et al. |
| 2020/0342426 A1 | 10/2020 | Grassadonia et al. |
| 2022/0245627 A1 | 8/2022 | Foster |
| 2022/0286852 A1 | 9/2022 | Kourtellis et al. |
| 2022/0292543 A1 | 9/2022 | Henderson |
| 2023/0034908 A1 | 2/2023 | Shaw |
| 2023/0245651 A1* | 8/2023 | Wang .............. G06N 5/022 704/275 |
| 2023/0376328 A1* | 11/2023 | Nagar .............. G10L 21/003 |

FOREIGN PATENT DOCUMENTS

| | | | |
|---|---|---|---|
| CN | 104885110 B | 3/2019 | |
| CN | 110286951 A | 9/2019 | |
| CN | 111123290 A | 5/2020 | |
| CN | 111399953 A | 7/2020 | |
| CN | 107278302 B | 8/2020 | |
| CN | 112205019 A | 1/2021 | |
| CN | 112416501 A | 2/2021 | |
| CN | 110459203 B * | 4/2022 | ........ G06Q 50/14 |
| CN | 115380506 A | 11/2022 | |
| CN | 117974260 A * | 5/2024 | ........ G06F 3/0482 |
| DE | 102016110553 A1 | 12/2017 | |
| EP | 1171826 A2 | 1/2002 | |
| EP | 1245023 A1 | 10/2002 | |
| EP | 1410667 A1 | 4/2004 | |
| EP | 1522190 A1 | 4/2005 | |
| EP | 2572498 A1 | 3/2013 | |
| EP | 2801065 A1 | 11/2014 | |
| EP | 2832068 A2 | 2/2015 | |
| EP | 2842295 A1 | 3/2015 | |
| EP | 2915114 A1 | 9/2015 | |
| EP | 3008943 A1 | 4/2016 | |
| EP | 3146412 A2 | 3/2017 | |
| EP | 3146746 A1 | 3/2017 | |
| EP | 3272105 A1 | 1/2018 | |
| EP | 2854048 B1 | 7/2018 | |
| EP | 3114635 B1 | 7/2022 | |
| JP | 2011517181 A | 5/2011 | |
| JP | 5944495 B2 | 6/2016 | |
| JP | 6513836 B2 * | 5/2019 | ........ G06Q 30/02 |
| JP | 7053729 B2 | 4/2022 | |
| KR | 101201095 B1 | 11/2012 | |
| KR | 101464403 B1 | 11/2014 | |
| KR | 102060879 B1 | 12/2019 | |
| KR | 102115109 B1 | 5/2020 | |
| KR | 102122918 B1 | 6/2020 | |
| WO | 0025536 A1 | 5/2000 | |
| WO | 2005122541 A2 | 12/2005 | |
| WO | 2005125163 A1 | 12/2005 | |
| WO | 2006005122 A1 | 1/2006 | |

(56) References Cited

FOREIGN PATENT DOCUMENTS

| | | | |
|---|---|---|---|
| WO | 2011083176 | A2 | 7/2011 |
| WO | 2011083177 | A1 | 7/2011 |
| WO | 2013148887 | A1 | 10/2013 |
| WO | 2013163338 | A2 | 10/2013 |
| WO | 2014074936 | A2 | 5/2014 |
| WO | 2014145637 | A1 | 9/2014 |
| WO | 2015112108 | A1 | 7/2015 |
| WO | 2015114460 | A2 | 8/2015 |
| WO | 2015191562 | A1 | 12/2015 |
| WO | 2016073304 | A1 | 5/2016 |
| WO | 2017044349 | A1 | 3/2017 |
| WO | 2018090139 | A1 | 5/2018 |
| WO | 2019021048 | A1 | 1/2019 |
| WO | 2020128455 | A2 | 6/2020 |
| WO | 2020148658 | A2 | 7/2020 |
| WO | 2020206204 | A1 | 10/2020 |
| WO | 2021011697 | A1 | 1/2021 |
| WO | 2021205240 | A1 | 10/2021 |
| WO | 2021211168 | A1 | 10/2021 |

\* cited by examiner

Here are some iPHONE deals/offers we have today

Looks like, you are iPhone user. If you are looking for Samsung or other Android device offers, please select other offers below

510
Up to $630 off with trade on Magenta MAX iPhone 12 Pro Max Thor Ultra Spiderman

As low as
Monthly
$41.67
for 24 mos.
$45.17

Today
$0.00
down + tax

Full price: $1099.99

520
Up to $630 off with activation of 4 lines iPhone 12 Pro Max Thor Ultra Spiderman

As low as
Monthly
$41.67
for 24 mos.
$45.17

Today
$0.00
down + tax

Full price: $1099.99

530
Up to 50% off on Magenta MAX iPhone 12 Mini Blackman

As low as
Monthly
$36.67
for 24 mos.
$39.17

Today
$0.00
down + tax

Full price: $999.99

| | | |
|---|---|---|
| 610 — Are you T-Mobile Customer? | ○ Yes | ● No |
| 620 — Are you interested in some of our latest deals? | ○ Devices | ● Rate Plans | ○ Both |
| 630 — How many lines are you looking to switch? | 630A ⊕ / 630B □□□ | | |
| 640 — How important is 5G data speeds and limits are? | ● Very | ○ Somewhat | ○ Not Really |
| 650 — Do you know the devices which you looking for? | ○ Yes | ● Show me some devices |
| 660 — Are you interested in trade-in your devices? | ○ Yes | ● No |
| 670 — Discounts (Age 55+, ...)? | ○ Age 55+ | ○ Veteran | ○ First Responders | ● None |

PERSONALIZING AN INTERACTION BETWEEN A MOBILE DEVICE ASSOCIATED WITH A USER AND AN APPLICATION OR A WEBSITE ASSOCIATED WITH A WIRELESS TELECOMMUNICATION NETWORK

BACKGROUND

The telecommunication service provider industry is one of the most competitive industries. It also ranks as one of the most challenged industries when it comes to user satisfaction. Cell phone service bills are one of the top recurring monthly expenses for most U.S. households. At the same time, cell phones and mobile devices are among the most highly coveted and significant purchases in U.S. households. Switching carriers or adding line(s) on the account are big decisions and significant financial commitments for the users. Switching carriers is not only a high-effort task but also a high-risk choice. As users face information overload and try to understand the intangible benefits of various options, trust and guidance during the shopping process are critical. Users typically take 30 to 40 days or more to switch carriers. Most of them find the in-store experience reassuring, supportive, and beneficial in terms of guidance. Users receive needed information and personal interaction, and their questions and concerns about trust or any other factors are addressed in a more satisfactory fashion than in a digital sales transaction. As a result of these dynamics, sales from self-service digital properties/channels have not reached double-digit percentages despite years of effort and multitudes of tactics. Despite changes in user shopping patterns brought on by the pandemic, digital sales are still in single digits. Current alternatives to address this challenge of making shopping personalized are: 1. Videos such as YouTube and other on-demand video/audio assistance; 2. Chabots with very limited rules engine to assist shopping; or 3. Human avatars explaining basic products and promotions for shopping. However, these approaches do not have personalization aspect to them, and are generic product presentations.

BRIEF DESCRIPTION OF THE DRAWINGS

Detailed descriptions of implementations of the present invention will be described and explained through the use of the accompanying drawings.

FIG. 5 shows a subsequent question presented based on the response to the initial question, according to one embodiment.

FIG. 6 shows a subsequent question presented based on the response to the initial question, according to another embodiment.

Figure 1:
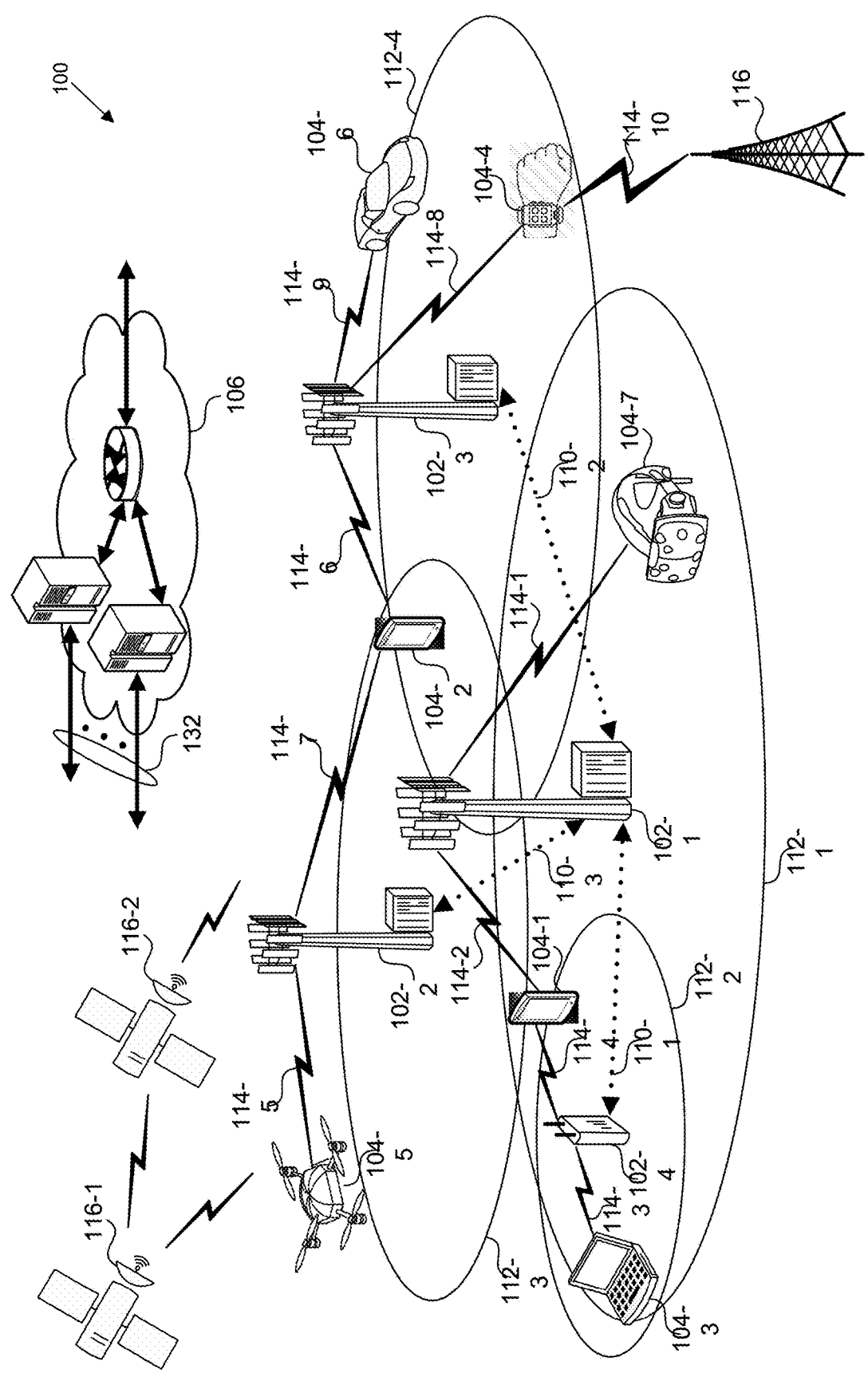
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to use an artificial intelligence (AI) to personalize an interaction between a mobile device associated with the user and an application ("app")/a website associated with a wireless telecommunication network. The system obtains data entries associated with the user including segmentation, preferences, behavior elements, contextual events, and trust expectations. The segmentation associated with the user is based on geographic location and/or demographics associated with the user. Trust expectations include complexity of information presented to the user. For example, the user may be busy and prefer simple and direct presentation of information. Alternatively, the user may be a connoisseur and prefer detailed and elaborate information associated with a product, such as a phone. Contextual events can include key events such as New Product Introduction, Mother's Day, Black Friday, Christmas, etc. The system obtains data entries associated with the wireless telecommunication network and network provider including other sources such as marketing insights/data which can include available products, available promotions, and selling channels.

The system trains the AI using the data entries associated with the user, the user context, and the data entries associated with the wireless telecommunication network and network provider including other sources such as marketing insights/data. For example, the user context can be that the user is at a baseball game while Mother's Day is coming versus the user is at home in the evening with no big marketing/promotional event upcoming. The system receives an indication to initiate an interaction between the mobile device and the app/the website associated with the wireless telecommunication network, where the interaction is aimed at completing a task, such as obtaining information, or making a purchase. Based on the indication to initiate the interaction, the data entries associated with the user, the user context, and the data entries associated with the wireless telecommunication network and network provider including other sources such as marketing insights/data, the system generates an initial question to present to the mobile device associated with the user. The system receives a response to the question from the mobile device. Based on the response, the AI generates a subsequent question to present to the mobile device associated with the user, where the subsequent question furthers completion of the task.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a user premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Figure 2:
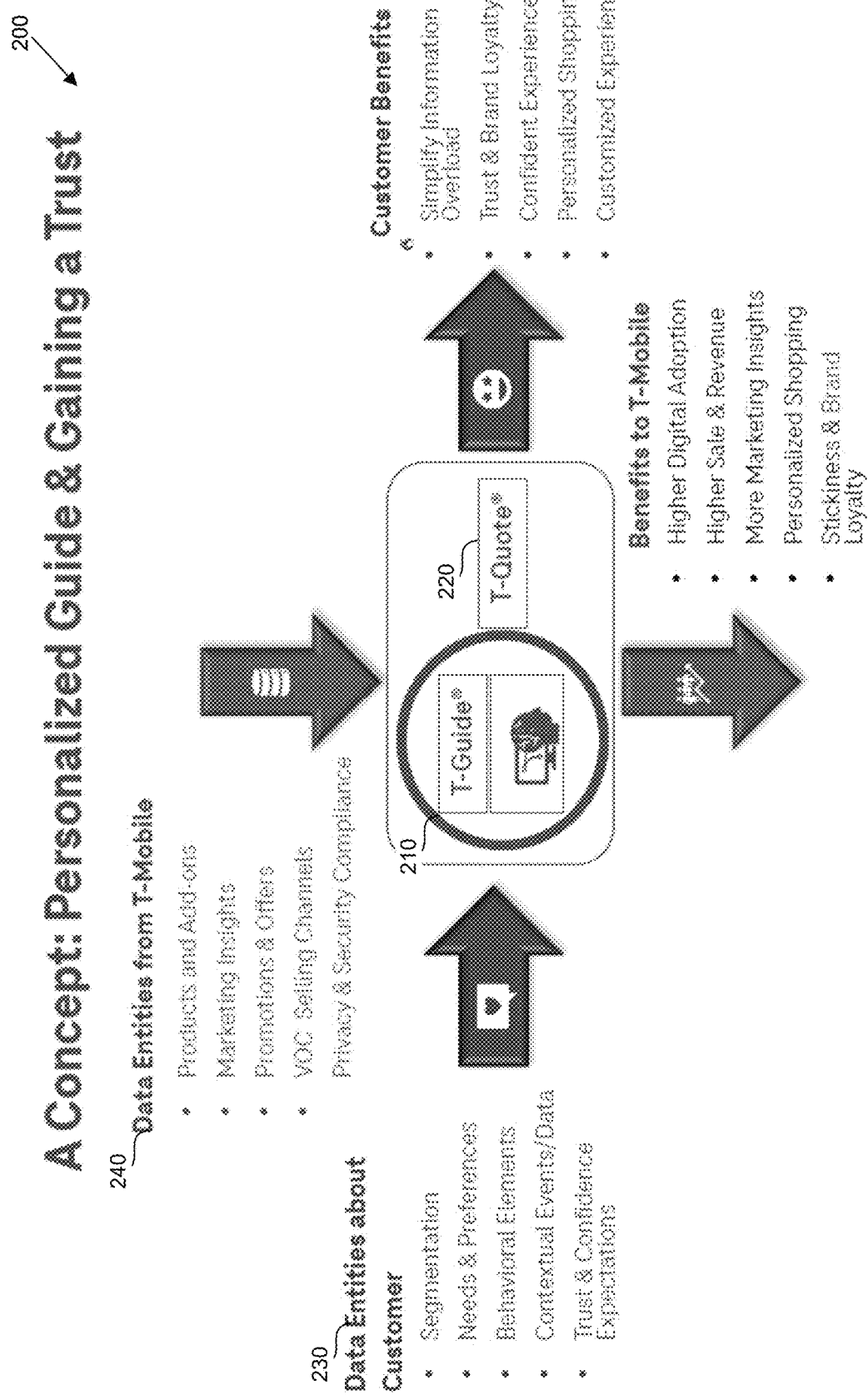
FIG. 2 shows conceptualized view of data categories involved as inputs to a system to personalize an interaction between a user and an app/a website associated with the network.
Figure 3:
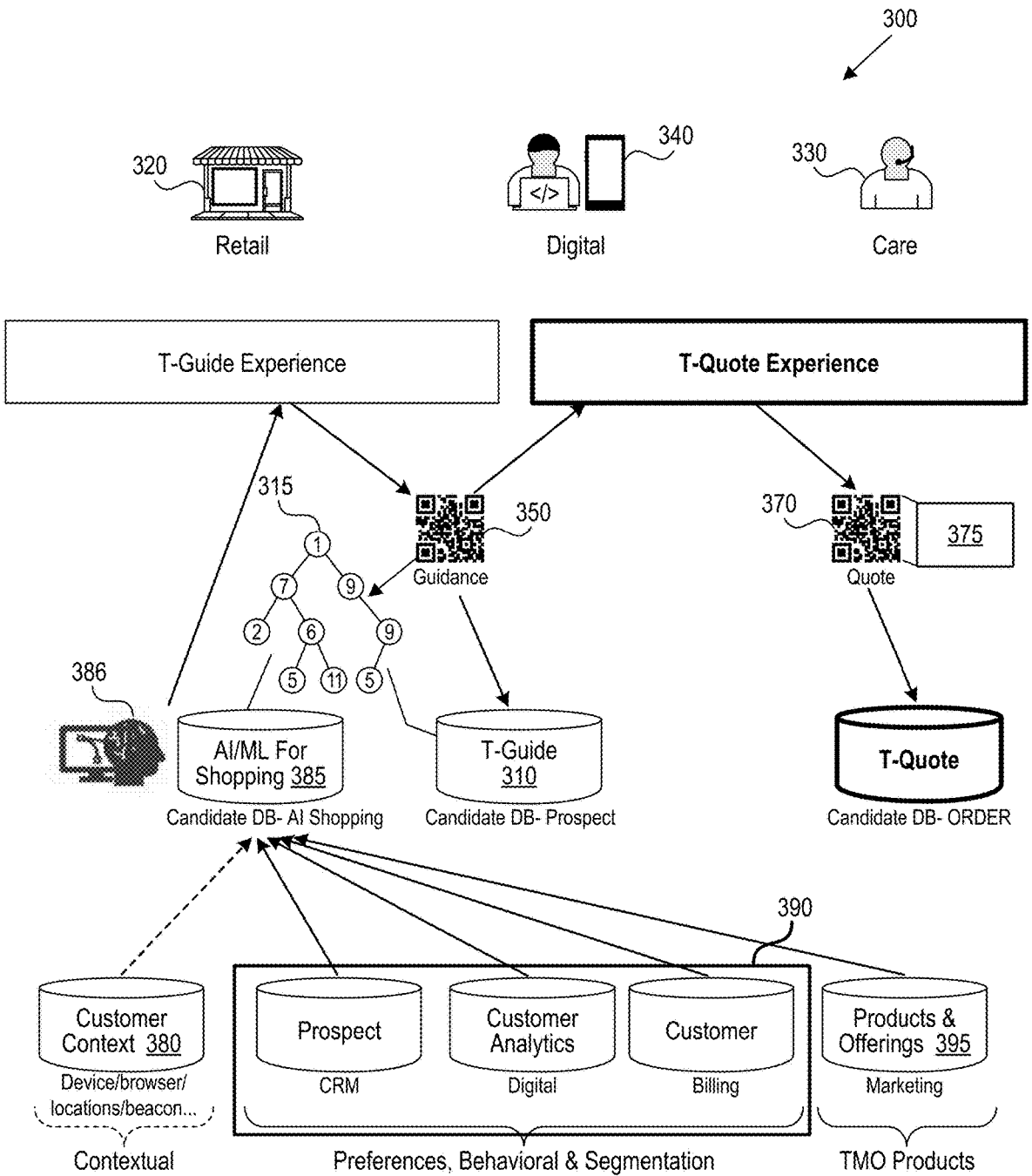
FIG. 3 shows a system context view with multitude of data repositories used to personalize an interaction between a user and an app/a website associated with the network.

Personalizing an Interaction Between a Mobile Device Associated with a User and an Application or a Website Associated with a Wireless Telecommunication Network FIG. 2 shows conceptualized view of data categories involved as inputs to a system to personalize an interaction between a user and an app/a website associated with the network 100 in FIG. 1. FIG. 2 also shows the tangible and intangible outcomes as benefits. For example, if the user is interested in shopping for a new product, or a new subscription, the system 200 can emulate the entire shopping and purchasing experience as if an experienced representative in a telecom retail store is guiding the user through a personalized and customized shopping experience. The system 200 can include a guide 210 and a quote 220. The guide 210 can be a trained artificial intelligence (AI) 210 that can provide the personalized user experience. System 210 can have two components as shown in FIGS. 3—385 (algorithms, rules, models, and training data) and 386 (programming to compute).

The AI 210 can be trained using input of data entries 230 associated with the user and their context, and input of data entries 240 associated with the network 100, marketing strategies including data collected from Voice of Customer (VOC), promotions and offers.

The data entries 230 associated with the user include segmentation, user's needs and preferences, behavior elements, contextual events, and trust and confidence. Segmentation is based on the user demographics and indicates which population segments the user belongs to, including geographic location, age, habits, phone usage patterns, data usage patterns, and spending preferences. Segmentation can include groups such as high school students, young professionals, elderly users, technology brand followers, cost-conscious users, etc. The needs and preferences can include needs such as number of lines, pricing constraints, bill expectations, speed/data limit expectations, and coverage, and preferences such as add-ons, additional perks, etc. Behavior elements can include whether the user is an Android user or an Apple user, video gamer versus occasional user of data intensive apps. For example, Android users may choose certain types of devices at certain times of the year (e.g. a big introduction of new devices by key highly sought after manufacturer). In another example, behavior elements can include whether the user tends to use social media and YouTube, whether the user tends to generate and upload content, browsing habits of the user, number of visits the user typically makes before making a purchase, etc. Contextual events can include events such as New Product Introduction (NPI), Mother's Day, Black Friday, Super Bowl, etc. NPI occurs when big original equipment manufacturers start selling new devices. For example, NPI occurs when Apple releases new devices in September every year. Trust and confidence can include the complexity of information to present to the user. For example, the user may be busy and prefer simple and direct presentation of information. Alternatively, the user may be a connoisseur and prefer detailed and elaborate information associated with a product, such as a phone.

The data entries 240 associated with the network 100 can include products and add-ons, marketing insights, promotions and offers, channels associated with the network such as web, app on device, care, and retail, and privacy and security compliance. Products can have transactional items such as devices, financial products such loans vs leases, subscription products such as rate plans for telecom services. Telecom services for which rate plans are offered can be voice, data, home internet, IoT (Internet of Things) services. Devices can be smartphones, tablets, wearables such as smartwatches, and/or IoT devices such as a pet-tracker. Add-ons can include device protection plans and insurance, additional services such as Netflix, SPAM protection, international calling. Note that financial products such as loan are offered to make purchasing of high-end devices more feasible as requested by users. Marketing insights are collections of data that provide marketers with valuable information regarding the wants and needs of the product's as well as brand's target demographic. It differs from the regular data science in that the numbers themselves are only representative of the insights. Privacy and security compliance refers to most of the personal data, often referred as personally identifiable information that cannot be used for certain usages without explicit consent from the user. Additionally, these data sets have security guidelines in terms of how and where they are stored and how they can be transmitted over the network. All these compliance aspects create further segments of data.

Once trained, the AI 210 can receive an indication of an interaction from the user. The AI 210 can obtain the data entries 230 associated with the particular user and the data entries 240 associated with the network 100, and can generate a question relevant to the user. The first question can include a request for information about the user's intent and goal for the interaction. In addition, the AI 210 can ask questions about what kind of experience the user expects, such as whether the user is in a hurry.

Based on the responses received, the AI 210 can identify the next question or set of questions to capture from the user, such as, if the user is shopping, in which products and services the user is interested. The AI 210 keeps generating questions through a series of dynamic decisions. The AI 210 infers the next question or set of questions to ask based on previous responses.

FIG. 3 shows a system context view with multitude of data repositories used to personalize an interaction between a user and an app/a website associated with the network 100 in FIG. 1. The AI 210385 can store algorithms, AI models, rules, machine learning (ML) training data, the set of customized questions asked as well as the set of responses received in a database 310 as a dynamic decision tree 315 is created and traversed. The interaction between the user and the AI 386 can be interrupted because the user had to leave the activity on device to attend to a personal matter (user leaves deliberately), the interaction may run out of time, or the connection may be dropped. However, this dynamic decision tree 315 can be retrieved at any time in any of the channels retail 320, care 330, and self-service 340, including applications and the World Wide Web, to continue the interaction at the point of interruption. The QR code 350 can be used to retrieve the point where the shopping journey was left/abandoned. The QR code 350 can retrieve the set of questions and responses as well as dynamic decision tree 315.

The system 300 can generate a unique identifier (ID) 350 associated with the dynamic decision tree 315. The unique ID 350 can be a QR code or a guide ID such as an alphanumeric string uniquely identifying the decision tree. The QR code 350 and the guide ID can be stored in the database for later retrieval in any of the channels 320, 330, 340. Both the QR code 350 and the guide ID can enable retrieval of the dynamic decision tree 315 in any of the channels 320, 330, 340.

Upon completion of the interaction, the AI 210 can produce two or more answers or options for the user, with one recommended option, which user can use to create a quote. Quote produced can have a QR code 470 and a Quote ID (not pictured). The QR code 470 and the quote ID can be stored in the database 310 for later retrieval in any of the channels 320, 330, 340, even after the interaction with the AI 386 is interrupted for any reason. There is no need to start over. For example, if the user is shopping, the user can pause to further shop around or take the time to make the decision.

The quote 375 can be converted into an order. The mapping between the quote 375 and the order can be 1-to-1. The quote 375 is immutable but can be edited. Once the quote 375 is edited, the system 300 can create another quote with a different unique ID. The quote can be valid for a certain period of time, such as up to a week. The data gathered during the interaction with the user can be used to further train the AI 485 and 386, as well as to gain marketing insights.

The system 300 can gather 80 million records from various users every day and can store the records in database 380. The system 300 can also capture more than 100 million records per day and can store the records in various databases 380390395. The database 395 can store the data entries 240 in FIG. 2 associated with the network 100 such as products offered for and by the network. The database 390 can store user billing data, information about potential users, and other data entries 230 in FIG. 2 associated with the user. The database 380 can store user context including user browser history, the location of the user, the network load at the user location, whether the user is at an event such as a concert or a baseball game, etc. The number of records stated in this section are expected to grow as the scale of the solution and the user demand increases.

Figure 4:
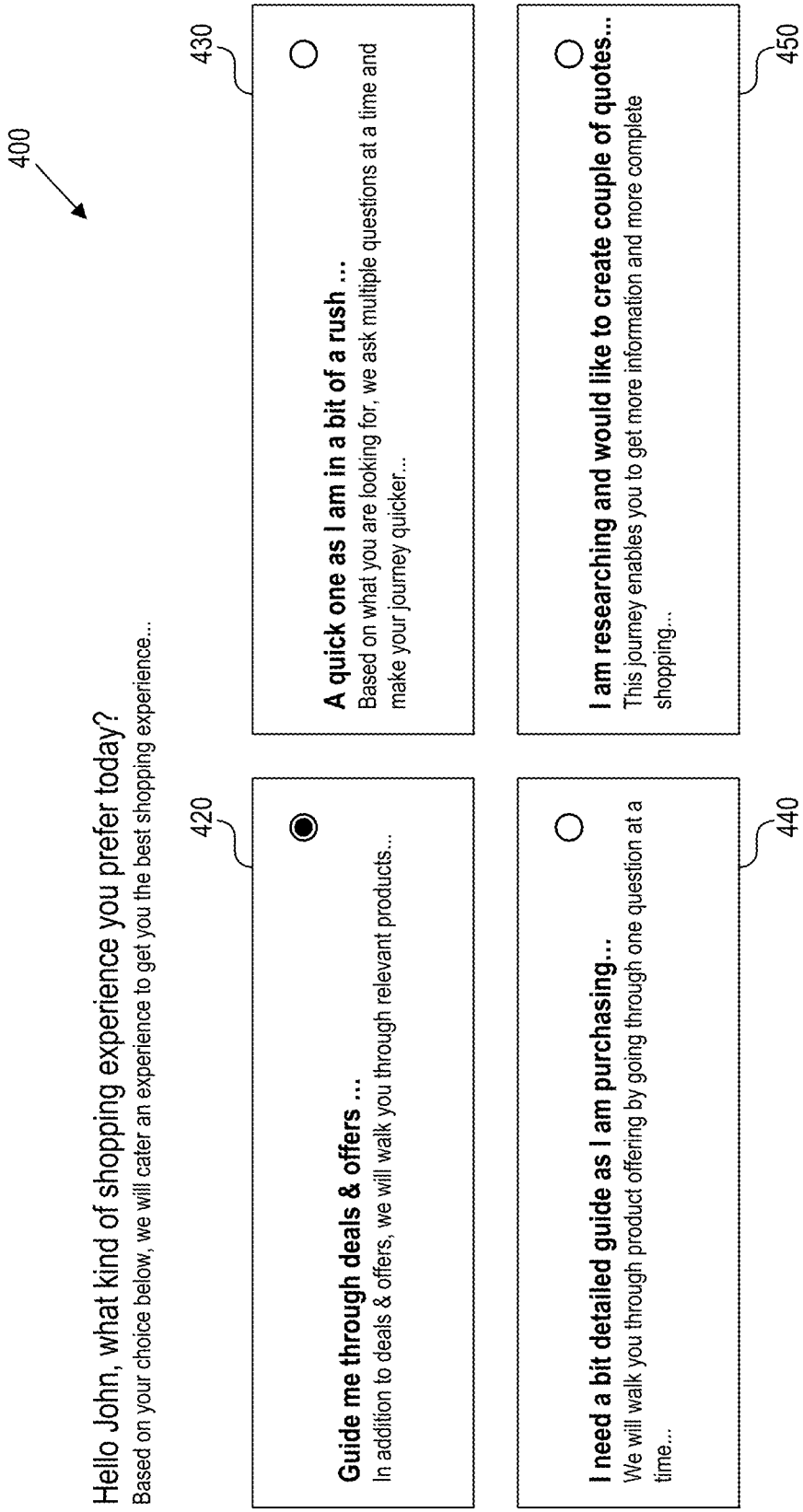
FIG. 4 shows an initial question that the system can ask.

FIG. 4 shows an initial question that the system 200 in FIG. 2, 300 in FIG. 3 can ask. The system 200, 300 can start a personalized and customized shopping experience by asking one or two standard questions to identify the user's basic profile, the intent of the shopping journey, and the kind of experience the user is seeking on that day and time. The user can choose a different experience based on various circumstances, such as either a quick pricing lookup or a thorough and detailed experience to make a final decision. For example, the user interface 400 can provide one way to pivot the experience.

The question 410 can be the initial question presented to the user. The question 410 can present single-choice answers 420, 430, 440, 450 enabling the user to quickly indicate the user's preference. The initial question 410 can ask the user to indicate an amount of time the user is willing to spend interacting with the network 100 in FIG. 1. For example, by selecting answer 430, the user indicates that the user is in a rush and wants to spend as little time as possible interacting with the system 200, 300. By selecting answer 420, the user indicates that the user is interested in seeing specific options but is not interested in getting background information. By selecting answer 440, the user indicates that the user is still in the information-gathering stage and is willing to invest a significant amount of time to narrow down the user's choices. By selecting answer 550, the user indicates that the user has decided to make a purchase but needs detailed information about which a handful/couple of choices to generate quote. 450

FIG. 5 shows a subsequent question presented based on the response to the initial question 410 in FIG. 4, according to one embodiment. Subsequent questions 500 can be presented as options 510, 520, 530 to the user. The subsequent questions 500 are based not only on user's responses to the initial question 410, but also on data entries 230 in FIG. 2 associated with the user, including the user's prior shopping behavior, the context in which the user operates, data entries 240 in FIG. 2 associated with the network 100 in FIG. 1 including current promotions/offers, and network 100 marketing insights data and user insights data.

Once the user has selected answer 420 in FIG. 4, the system 200 in FIG. 2, 300 in FIG. 3 can determine that the user is an Android user based on data entries 230. In addition, the system 200, 300 can determine that the date is close to Mother's Day based on contextual data included in data entries 230. Based on the past shopping experiences stored in data entries 230, the system 200, 300 can determine that the user tends to buy an iPhone around Mother's Day for the user's mom. Further, based on the past shopping experiences stored in data entries 230, the system 200, 300 can determine that the user is cost conscious. Consequently, the system 200, 300 can retrieve discounts from the data entries 240 associated with the network 100, and present those discounts as options 510, 520, 530.

FIG. 6 shows subsequent questions presented based on the response to the initial question 410 in FIG. 4, according to another embodiment. The number of questions the system 200 in FIG. 2, 300 in FIG. 3 presents and/or the number of steps in the shopping journey are identified based on the user's preference at the outset of the shopping experience. If the user is in a hurry, the system can present questions 610, 620, 630, 640, 650, 660, 670 in one user interface 600. The system 200, 300 can gather the needed information and determine the relevant options to present to the user based on the questions 610, 620, 630, 640, 650, 660, 670. That way, the system 200, 300 reduces the number of steps the user needs to take before being presented with the options such as options 510, 520, 530 in FIG. 5.

For example, the user interface 600 can include questions 610, 620, 630, 640, 650, 660, 670 and multiple-choice answers. For example, question 610 can ask, "Are you a network 100 customer?" and present the answers "Yes" and "No." Question 620 can ask, "Are you interested in some of our latest deals?" and present the answers "Devices," "Rate Plans," and "Both." Question 630 can ask, "How many lines are you looking to switch?" and present widgets 730A, 730B enabling the user to increase and decrease the number of lines. Question 640 can ask, "How important are 5G data speeds and limits?" and present the answers "Very," "Somewhat," and "Not Really." Question 650 can ask, "Do you know which devices you're looking for?" and present the answers "Yes" and "Show me some devices." Question 660 can ask, "Are you interested in trading in your devices?" and present the answers "Yes" and "No." Question 670 can ask, "Are you eligible for any discounts?" and present the answers "Age 55+," "Veteran," "First Responder," and "None."

Figure 7:
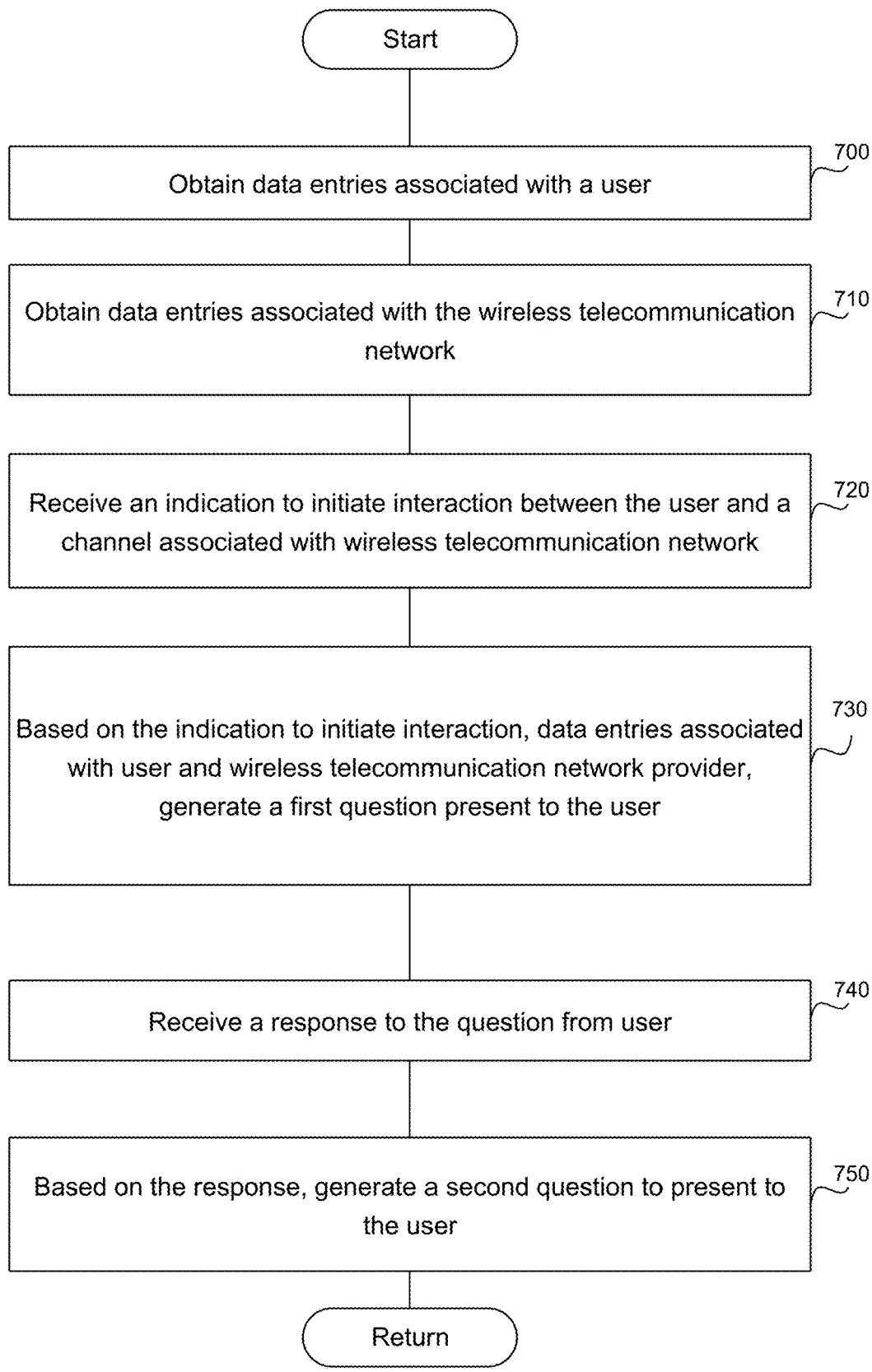
FIG. 7 is a flowchart of one of the methods to personalize an interaction between a user and a channel associated with a wireless telecommunication network.

FIG. 7 is a flowchart of one of the methods to personalize an interaction between a user and a channel associated with a wireless telecommunication network. In step 700, a hardware or software processor executing instructions described in this application can obtain data entries associated with a user including segmentation, preferences, behavior elements, contextual events, and trust expectations. The segmentation associated with the user can be based on geographical location and demographics associated with the user. The trust expectations include complexity of information presented to the user. Contextual events include events affecting multiple users such as New Product Introduction, Mother's Day, Black Friday, Father's Day, etc.

In step 710, the processor can obtain data entries associated with the wireless telecommunication network and network provider including other sources such as marketing insights/data including available products, available promotions, and selling channels. The processor can train an AI using the data entries associated with the user and the data entries associated with the wireless telecommunication network and network provider including other sources such as marketing insights/data.

In step 720, the processor can receive an indication to initiate an interaction between the user and a channel associated with the wireless telecommunication network, where the interaction is aimed at completing a task.

In step 730, based on the indication to initiate the interaction, the data entries associated with the user, and the data entries associated with the wireless telecommunication network and network provider including other sources such as marketing insights/data, the processor can generate a first question to present to the user.

In step 740, the processor can receive a response to the question from the user. In step 750, based on the response, the processor can generate a second question to present to the user, where the second question furthers completion of the task.

The processor can receive an indication to interrupt the interaction between the user and the wireless telecommunication network. The processor can generate a unique identifier, such as a QR code, associated with the interaction from initiation to interruption. The processor can provide the unique identifier and the indication of the time period to the user. After interrupting the interaction between the user and the wireless telecommunication network, the processor can receive the unique identifier at a channel associated with the wireless telecommunication network. The channel can include a website, a store, a data channel, or a voice channel. Based on the unique identifier, the processor can retrieve the interaction from initiation to interruption. The processor can enable the user to continue with the interaction from the interruption, thereby preventing the user from having to start the interaction from the initiation.

The processor can receive an indication to interrupt the interaction between the user and the wireless telecommunication network. The processor can generate a unique identifier, such as a QR code, associated with the interaction from initiation to interruption, and an indication of a time period, such as 7 days, during which the unique identifier is valid. The processor can provide the unique identifier and the indication of the time period to the user. At a first time after interrupting the interaction between the user and the wireless telecommunication network, the processor can receive the unique identifier which can be channel agnostic, where the channel includes a website, a store, a data channel, or a voice channel. Based on the unique identifier, the processor can retrieve the interaction from initiation to interruption. The processor can determine whether the first time is within the time period during which the unique identifier is valid. Upon determining that the first time is within the time period during which the unique identifier is valid, the processor can enable the user to continue with the interaction from the interruption, thereby preventing the user from having to start the interaction from the initiation. Upon determining that the first time is not within the time period during which the unique identifier is valid, the processor can provide an indication to the user that the time period has expired.

Figure 9:
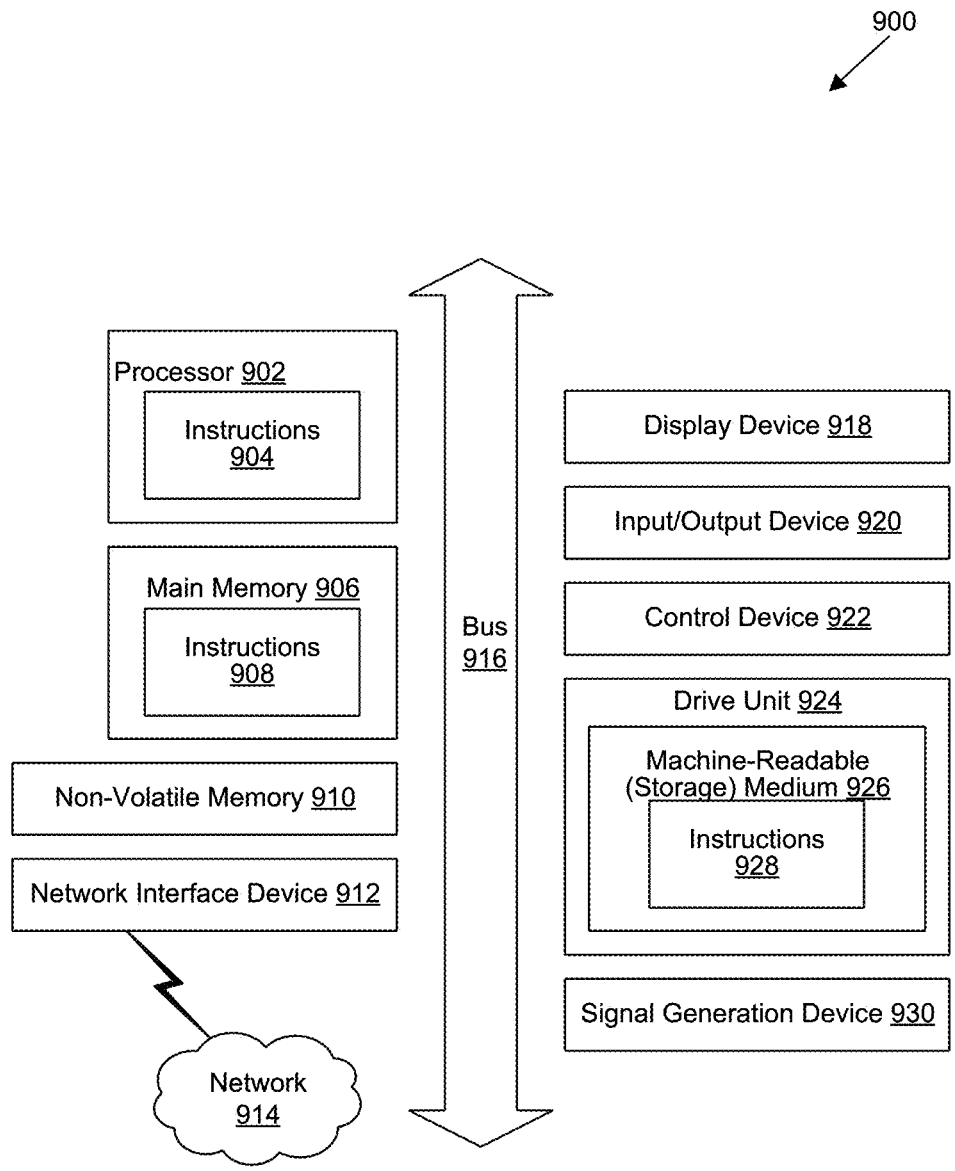
FIG. 9 is a block diagram that illustrates an example of a computer system 900 in which at least some operations described herein can be implemented.

The core of the solution/invention is to use multitude of data sources shown in the system 200 and 300 on the platform 100 using computational processing similar to 900 in FIG. 9 and using multitudes of algorithms used in traditional AI to create an output which can mimic the best possible human interaction. The human interaction of retail-store salesperson and user where the salesperson's follow up questions/response in a series of questions and answers dialogue is based on how the user responds. The multitudes of algorithms can be traditional and not Generative AI algorithms. Some of the algorithms used are—dynamic decision tree, ensemble of dynamic decision trees, dimensionality reduction algorithms, gradient boosting algorithms, Naïve Bayesian model. FIG. 2 depicts this where 230 and 240 are inputs to create "numerous" responses to create personalized experience/output. Below are some of the examples.

In one embodiment, the processor can generate the first question asking for an amount of time the user can dedicate to interacting with an app or the website. The first question can include a first amount of time or a second amount of time, where the first amount of time is less than the second amount of time. The processor can receive a selection of the first amount of time. Based on the selection of the first amount of time, the processor can reduce a number of subsequent questions presented to the user, especially when compared to the number of questions presented had the user selected the second amount of time.

In another embodiment, the processor can generate the first question asking for an amount of time the user can dedicate to interacting with an app or the website. The first question can include a first amount of time or a second amount of time, where the first amount of time is less than the second amount of time. The processor can receive a selection of the second amount of time. Based on the selection of the second amount of time, the data entries associated with the user, and the data entries associated with the wireless telecommunication network and network provider including other sources such as marketing insights/data, the processor can determine relevant information to present to the user. The processor can present the relevant information to the user.

In a third embodiment, the processor can determine the user context and can match the user with the offers provided by the network. For example, the processor can determine that the user's context includes the baseball game, and that the user's daughter is graduating. Consequently, the processor can send the user a message stating "Hello, it looks like you are the baseball game and your daughter's graduation is coming up, would you like to see a new deal on Smartwatches?" The processor can keep the conversation brief and to point.

In a fourth embodiment, the processor can recognize user's multiple attempts to get the right product. Consequently, the processor can let the user know "Hello, it looks like you are having difficult choosing the right rate plan for the new iPhone you plan to buy. I noticed you visited the store last week and website couple of times. May I suggest Global plan as it suites your frequent international trips and calling family in Mexico?"

Figure 8:
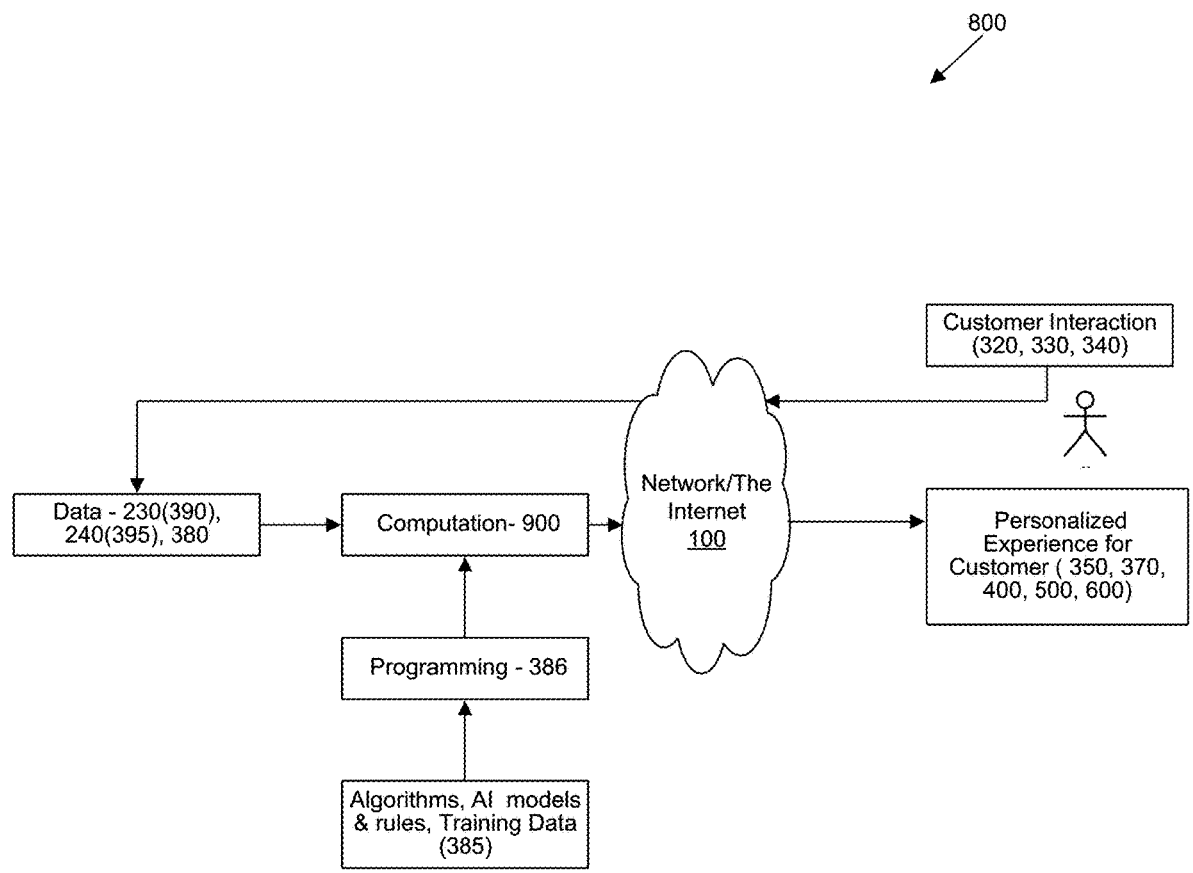
FIG. 8 shows an overview of the system including the various components described in this application.

FIG. 8 shows an overview of the system 800 including the various components described in this application. The disclosed technology may exclude generative AI algorithms. Hence, the inferences reached by the AI are more controlled.

The system 800 can convert the output text to voice or a human avatar configured to converse with the user.

Computer System

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or can include one or more cloud components in one or more networks. Where appropriate, one or more computer systems 900 can perform operations in real time, in near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to use an artificial intelligence (AI) to personalize an interaction between a mobile device associated with a user and an application or a website associated with a wireless telecommunication network, which, when executed by at least one data processor of a system, cause the system to:

obtain data entries associated with the user including segmentation, preferences, behavior elements, contextual events, and trust expectations,
  wherein the segmentation associated with the user is based on demographics associated with the user, and
  wherein the trust expectations include complexity of information presented to the user;
obtain data entries associated with the wireless telecommunication network including available products, available promotions, and selling channels;
receive an indication to initiate an interaction between the mobile device and the application or the website associated with the wireless telecommunication network,
  wherein the interaction is aimed at completing a task;
based on the indication to initiate the interaction, generate a first question to present to the mobile device associated with the user,
  wherein the first question is generated based on applying the data entries associated with the user and the data entries associated with the wireless telecommunication network as inputs to the AI;
receive a first response to the first question from the mobile device;
based on the first response, generate, by the AI, a second question to present to the mobile device associated with the user, wherein the second question furthers completion of the task;
receive a second response to the second question from the mobile device;
receive an indication to interrupt the interaction between the mobile device and the wireless telecommunication network;
in response to receiving the indication to interrupt the interaction:
  generate a quick response (QR) code associated with the interaction from initiation to interruption;
  provide the QR code to the mobile device associated with the user;
  after interrupting the interaction between the mobile device and the wireless telecommunication network, receive the QR code at a channel associated with the wireless telecommunication network,
    wherein the channel includes a website, a store, a data channel, or a voice channel;
  based on the QR code, retrieve the interaction from initiation to interruption; and
  enable the mobile device to continue with the interaction from the interruption, thereby preventing the user from having to start the interaction from the initiation.

2. The at least one non-transitory computer-readable storage medium of claim 1,
  wherein the AI is based on at least one of a dynamic decision tree algorithm, a dimensionality reduction algorithm, a gradient boosting algorithm, or a naïve Bayesian model.

3. The at least one non-transitory computer-readable storage medium of claim 1, comprising instructions to:
  in response to receiving the indication to interrupt the interaction between the mobile device and the wireless telecommunication network;
  further generate an indication of a time period during which the QR code is valid;
  provide the QR code and the indication of the time period to the mobile device associated with the user;
  at a first time after interrupting the interaction between the mobile device and the wireless telecommunication network, receive the QR code at a channel associated with the wireless telecommunication network,
    wherein the channel includes a website, a store, a data channel, or a voice channel;
  based on the QR code, retrieve the interaction from initiation to interruption;
  determine whether the first time is within the time period during which the QR code is valid;
  upon determining that the first time is within the time period during which the QR code is valid, enable the mobile device to continue with the interaction from the interruption, thereby preventing the user from having to start the interaction from the initiation; and
  upon determining that the first time is not within the time period during which the QR code is valid, provide an indication to the mobile device that the time period has expired.

4. The at least one non-transitory computer-readable storage medium of claim 1, comprising instructions to:
  in response to receiving the indication to interrupt the interaction between the mobile device and the wireless telecommunication network:
  further generate an indication of a time period during which the QR code is valid; and
  provide the QR code and the indication of the time period to the mobile device associated with the user.

5. The at least one non-transitory computer-readable storage medium of claim 1, wherein the instructions to generate the first question comprise instructions to:
  generate the first question asking for an amount of time the mobile device can dedicate to interacting with the application or the website,
    wherein the first question includes a first amount of time or a second amount of time, and
    wherein the first amount of time is less than the second amount of time;
  receive a selection of the first amount of time; and
  based on the selection of the first amount of time, reduce a number of subsequent questions presented to the mobile device.

6. The at least one non-transitory computer-readable storage medium of claim 1, wherein the instructions to generate the first question comprise instructions to:
  generate the first question asking for an amount of time the mobile device can dedicate to interacting with the website,
    wherein the first question includes a first amount of time or a second amount of time, and
    wherein the first amount of time is less than the second amount of time;
  receive a selection of the second amount of time;
  based on the selection of the second amount of time, the data entries associated with the user, and the data entries associated with the wireless telecommunication network, determine relevant information to present to the mobile device; and
  present the relevant information to the mobile device.

7. The at least one non-transitory computer-readable storage medium of claim 1, wherein the instructions to generate the first question comprise instructions to:
  generate the first question asking for an amount of time the mobile device can dedicate to interacting with the website.

8. A system comprising:
at least one hardware processor; and
at least one non-transitory memory storing instructions, which, when executed by the at least one hardware processor, cause the system to:
  obtain data entries associated with a user including segmentation, preferences, behavior elements, contextual events, and trust expectations,
    wherein the segmentation associated with the user is based on demographics associated with the user, and
    wherein the trust expectations include complexity of information presented to the user;
  obtain data entries associated with a wireless telecommunication network including available products, available promotions, and selling channels;
  receive an indication to initiate an interaction between the user and a channel associated with the wireless telecommunication network, wherein the interaction is aimed at completing a task;
  based on the indication to initiate the interaction, generate a first question to present to the user,
    wherein the first question is generated based on applying the data entries associated with the user and the data entries associated with the wireless telecommunication network as inputs to an artificial intelligence (AI);
  receive a first response to the first question from the user;
  based on the first response, generate, by the AI, a second question to present to the user,
    wherein the second question furthers completion of the task;
  receive a second response to the second question from the mobile device;
  receive an indication to interrupt the interaction between the mobile device and the wireless telecommunication network;
  in response to receiving the indication to interrupt the interaction:
    generate a quick response (QR) code associated with the interaction from initiation to interruption;
    provide the QR code to the mobile device associated with the user;
    after interrupting the interaction between the mobile device and the wireless telecommunication network, receive the QR code at a channel associated with the wireless telecommunication network,
      wherein the channel includes a website, a store, a data channel, or a voice channel;
    based on the QR code, retrieve the interaction from initiation to interruption; and
    enable the mobile device to continue with the interaction from the interruption, thereby preventing the user from having to start the interaction from the initiation.

9. The system of claim 8,
wherein the AI is based on at least one of a dynamic decision tree algorithm, a dimensionality reduction algorithm, a gradient boosting algorithm, or a naïve Bayesian model.

10. The system of claim 8, comprising instructions to:
in response to receiving the indication to interrupt the interaction between the user and the wireless telecommunication network:
  further generate an indication of a time period during which the QR code is valid;
  provide the QR code and the indication of the time period to the user;
  at a first time after interrupting the interaction between the user and the wireless telecommunication network, receive the QR code at a channel associated with the wireless telecommunication network,
    wherein the channel includes a website, a store, a data channel, or a voice channel;
  based on the QR code, retrieve the interaction from initiation to interruption;
  determine whether the first time is within the time period during which the QR code is valid;
  upon determining that the first time is within the time period during which the QR code is valid, enable the user to continue with the interaction from the interruption, thereby preventing the user from having to start the interaction from the initiation; and
  upon determining that the first time is not within the time period during which the QR code is valid, provide an indication to the user that the time period has expired.

11. The system of claim 8, comprising instructions to:
in response to receiving the indication to interrupt the interaction between the user and the wireless telecommunication network:
  further generate an indication of a time period during which the QR code is valid; and
  provide the QR code and the indication of the time period to the user.

12. The system of claim 8, wherein the instructions to generate the first question comprise instructions to:
  generate the first question asking for an amount of time the user can dedicate to interacting with the channel associated with the wireless telecommunication network,
    wherein the first question includes a first amount of time or a second amount of time, and
    wherein the first amount of time is less than the second amount of time;
  receive a selection of the first amount of time; and
  based on the selection of the first amount of time, reduce a number of subsequent questions presented to the user.

13. The system of claim 8, wherein the instructions to generate the first question comprise instructions to:
  generate the first question asking for an amount of time the user can dedicate to interacting with the channel associated with the wireless telecommunication network,
    wherein the first question includes a first amount of time or a second amount of time, and
    wherein the first amount of time is less than the second amount of time;
  receive a selection of the second amount of time;
  based on the selection of the second amount of time, the data entries associated with the user, and the data entries associated with the wireless telecommunication network, determine relevant information to present to the user; and
  present the relevant information to the user.

14. The system of claim 8, wherein the instructions to generate the first question comprise instructions to:
  generate the first question asking for an amount of time the user can dedicate to interacting with the channel associated with the wireless telecommunication network.

15. A method comprising:
obtaining data entries associated with a user including segmentation, preferences, behavior elements, contextual events, and trust expectations,
wherein the segmentation associated with the user is based on demographics associated with the user, and
wherein the trust expectations include complexity of information presented to the user;
obtaining data entries associated with a wireless telecommunication network including available products, available promotions, and selling channels;
receiving an indication to initiate an interaction between the user and a channel associated with the wireless telecommunication network,
wherein the interaction is aimed at completing a task;
based on the indication to initiate the interaction, generating a first question to present to the user,
wherein the first question is generated based on applying the data entries associated with the user and the data entries associated with the wireless telecommunication network as inputs to an artificial intelligence (AI);
receiving a first response to the first question from the user;
based on the first response, generating a second question to present to the user, wherein the second question furthers completion of the task;
receiving a second response to the second question from the mobile device;
receiving an indication to interrupt the interaction between the mobile device and the wireless telecommunication network;
in response to receiving the indication to interrupt the interaction:
generating a quick response (QR) code associated with the interaction from initiation to interruption;
providing the QR code to the mobile device associated with the user;
after interrupting the interaction between the mobile device and the wireless telecommunication network, receiving the QR code at a channel associated with the wireless telecommunication network,
wherein the channel includes a website, a store, a data channel, or a voice channel;
based on the QR code, retrieving the interaction from initiation to interruption; and
enabling the mobile device to continue with the interaction from the interruption, thereby preventing the user from having to start the interaction from the initiation.

16. The method of claim 15,
wherein the AI is based on at least one of a dynamic decision tree algorithm, a dimensionality reduction algorithm, a gradient boosting algorithm, or a naïve Bayesian model.

17. The method of claim 15, comprising:
in response to receiving the indication to interrupt the interaction between the user and the wireless telecommunication network:
further generating an indication of a time period during which the QR code is valid;
providing the QR code and the indication of the time period to the user;
at a first time after interrupting the interaction between the user and the wireless telecommunication network, receiving the QR code at a channel associated with the wireless telecommunication network,
wherein the channel includes a website, a store, a data channel, or a voice channel;
based on the QR code, retrieving the interaction from initiation to interruption;
determining whether the first time is within the time period during which the QR code is valid;
upon determining that the first time is within the time period during which the QR code is valid, enabling the user to continue with the interaction from the interruption, thereby preventing the user from having to start the interaction from the initiation; and
upon determining that the first time is not within the time period during which the QR code is valid, providing an indication to the user that the time period has expired.

18. The method of claim 15, comprising:
in response to receiving the indication to interrupt the interaction between the user and the wireless telecommunication network:
generating an indication of a time period during which the QR code is valid; and
providing the QR code and the indication of the time period to the user.

19. The method of claim 15, wherein generating the first question comprises:
generating the first question asking for an amount of time the user can dedicate to interacting with the channel associated with the wireless telecommunication network,
wherein the first question includes a first amount of time or a second amount of time, and
wherein the first amount of time is less than the second amount of time;
receiving a selection of the first amount of time; and
based on the selection of the first amount of time, reducing a number of subsequent questions presented to the user.

20. The method of claim 15, wherein generating the first question comprises:
generating the first question asking for an amount of time the user can dedicate to interacting with the channel associated with the wireless telecommunication network,
wherein the first question includes a first amount of time or a second amount of time, and
wherein the first amount of time is less than the second amount of time;
receiving a selection of the second amount of time;
based on the selection of the second amount of time, the data entries associated with the user, and the data entries associated with the wireless telecommunication network, determining relevant information to present to the user; and
presenting the relevant information to the user.

* * * * *